United States Patent
Sun et al.

(10) Patent No.: US 11,677,608 B1
(45) Date of Patent: Jun. 13, 2023

(54) SYSTEMS AND METHODS FOR TRANSMITTING DATA VIA A CABLE

(71) Applicant: Cable Television Laboratories, Inc., Louisville, CO (US)

(72) Inventors: Ruoyu Sun, Westminster, CO (US); Jingjie Zhu, Erie, CO (US); Mark J. Poletti, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/367,395

(22) Filed: Jul. 4, 2021

Related U.S. Application Data (62) Division of application No. 16/727,558, filed on Dec. 26, 2019, now Pat. No. 11,057,261.

(60) Provisional application No. 62/785,131, filed on Dec. 26, 2018.

(51) Int. Cl.
*H04L 27/26* (2006.01)

(52) U.S. Cl.
CPC ........ *H04L 27/2698* (2013.01); *H04L 27/265* (2013.01); *H04L 27/2628* (2013.01)

(58) Field of Classification Search
CPC ..... H04L 5/0005; H04L 5/0007; H04L 5/001; H04L 27/2621; H04L 27/2628; H04L 27/265; H04L 27/2651; H04L 27/26526; H04L 27/26536; H04L 27/26538; H04L 27/2654; H04L 27/2698; H04L 2027/0024; H04L 2027/003
USPC ....... 375/147, 148, 150, 152, 257, 260–262, 375/265, 267, 340, 341, 343, 347, 349; 370/208, 210, 343, 345; 708/403–405
See application file for complete search history.

(56) References Cited

U.S. PATENT DOCUMENTS

| | | | |
|---|---|---|---|
| 7,693,429 B1* | 4/2010 | Lowery | H04B 10/548 398/192 |
| 2002/0048334 A1* | 4/2002 | Hasegawa | H04L 27/2614 375/360 |
| 2006/0078058 A1* | 4/2006 | Lin | H04L 27/2647 375/260 |
| 2010/0329196 A1* | 12/2010 | Kwon | H04L 5/0083 370/329 |
| 2013/0051804 A1* | 2/2013 | Chung | H04L 27/2697 398/79 |
| 2013/0286959 A1 | 10/2013 | Lou et al. | |
| 2016/0218905 A1 | 7/2016 | Roh et al. | |
| 2016/0241351 A1 | 8/2016 | Suzuki et al. | |
| 2016/0337009 A1 | 11/2016 | Kubo et al. | |
| 2017/0019282 A1 | 1/2017 | Madaiah et al. | |
| 2017/0134203 A1 | 5/2017 | Zhu et al. | |

(Continued)

FOREIGN PATENT DOCUMENTS

| | | | | |
|---|---|---|---|---|
| CN | 1830017 A | * | 9/2006 | G09G 3/3685 |
| JP | 2006174139 A | * | 6/2006 | G09G 3/3685 |

*Primary Examiner* — Young T. Tse
(74) *Attorney, Agent, or Firm* — PdZ Patent Law, PLLC (57) ABSTRACT

A method for transmitting data via a coaxial electrical cable includes (a) converting symbols of each input data stream of a plurality of parallel input data streams from digital form to analog form, (b) individually filtering symbols of each input data stream, (c) transforming symbols of each input data stream from a first frequency-domain to a first time-domain, to generate parallel first time-domain samples, (d) converting the first time-domain samples to a serial multi-carrier signal, and (e) injecting the multi-carrier signal onto the coaxial electrical cable.

18 Claims, 6 Drawing Sheets

(56) References Cited

U.S. PATENT DOCUMENTS

2017/0257249 A1\* 9/2017 Hong ................ H04L 27/26416
2018/0035179 A1\* 2/2018 Lee ....................... H04W 72/04
2019/0020515 A1 1/2019 Yoshizawa et al.

\* cited by examiner

FIG. 8

SYSTEMS AND METHODS FOR TRANSMITTING DATA VIA A CABLE

RELATED APPLICATIONS

This application is a divisional of U.S. patent application Ser. No. 16/727,558, filed on Dec. 26, 2019, which claims benefit of priority to U.S. Provisional Patent Application Ser. No. 62/785,131, filed on Dec. 26, 2018. Each of the aforementioned applications is incorporated herein by reference.

BACKGROUND

Cable communication networks are widely used to provide communication services to subscribers. For example, cable communication networks commonly provide Internet, voice, and/or video services to residences and businesses. As another example, cable communication networks are increasingly being used to provide communication services, such as back-haul services and mid-haul services, to wireless base stations, such as cellular telephone towers. Cable communication networks frequently use a hybrid of communication media, including coaxial electrical cable, for data transmission.

Modern cable communication networks, such as Data Over Cable Service Interface Specification (DOCSIS) 3.1 networks, use orthogonal frequency division multiplexing (OFDM) to transmit data over coaxial electrical cable. OFDM includes dividing a serial data stream into multiple parallel data streams and modulating respective sub-carrier signals of a common carrier signal according to the parallel data streams. The sub-carrier signals are ideally orthogonal to each other, to prevent interaction between sub-carrier signals. Each sub-carrier signal is modulated at a relatively low symbol rate, which promotes robust communication, and the plurality of subcarrier signals collectively form a wideband communication signal. OFDM advantageously promotes efficient use of a communication medium, as well as tolerance to non-ideal operating conditions.

DETAILED DESCRIPTION OF THE EMBODIMENTS

While use of OFDM in cable communication networks has significant advantages, it also has some drawbacks. For example, although OFDM sub-carrier signals are ideally orthogonal to each other, real-world sub-carrier signals are not completely orthogonal, such as due to out-of-band (OOB) emissions from the sub-carrier signals, frequency offsets of each subcarrier, echo in cable networks, and multipath components in wireless networks. These non-ideal effects undesirably cause inter-carrier interference (ICI) and inter-symbol interference (ISI). A cyclic prefix (CP) may be added to the beginning of symbols, to mitigate ISI. However, use of CPs results in significant overhead, which reduces cable communication network data transmission efficiency. Additionally, these non-ideal effects may limit modulation order, thereby further limiting cable communication network data transmission efficiency.

Disclosed herein are systems and methods for transmitting data via a coaxial electrical cable, which may at least partially overcome the above-discussed drawbacks. The new systems and methods advantageously individually filter symbols of each input data stream of a plurality of parallel input data streams, before the symbols are transformed from a frequency-domain to a time domain at a transmitter, and after the symbols are transformed from a time domain to a frequency domain at a receiver. Such individual filtering of each input data stream advantageously helps reduce OOB emissions to a level that is lower than is typically achievable with OFDM. Accordingly, certain embodiments of the new systems and methods do not require use of CPs, thereby promoting high data transmission efficiency. Additionally, reduction in OOB emissions that is achieved by individually filtering each parallel input data stream may allow use of a higher modulation order than is feasible with OFDM, thereby further promoting data rate and spectrum efficiency. Furthermore, the reduction in OOB emissions achievable by the new systems and methods may enable frequency domain equalization, which is ordinarily required in OFDM systems, to be omitted.

Figure 1:
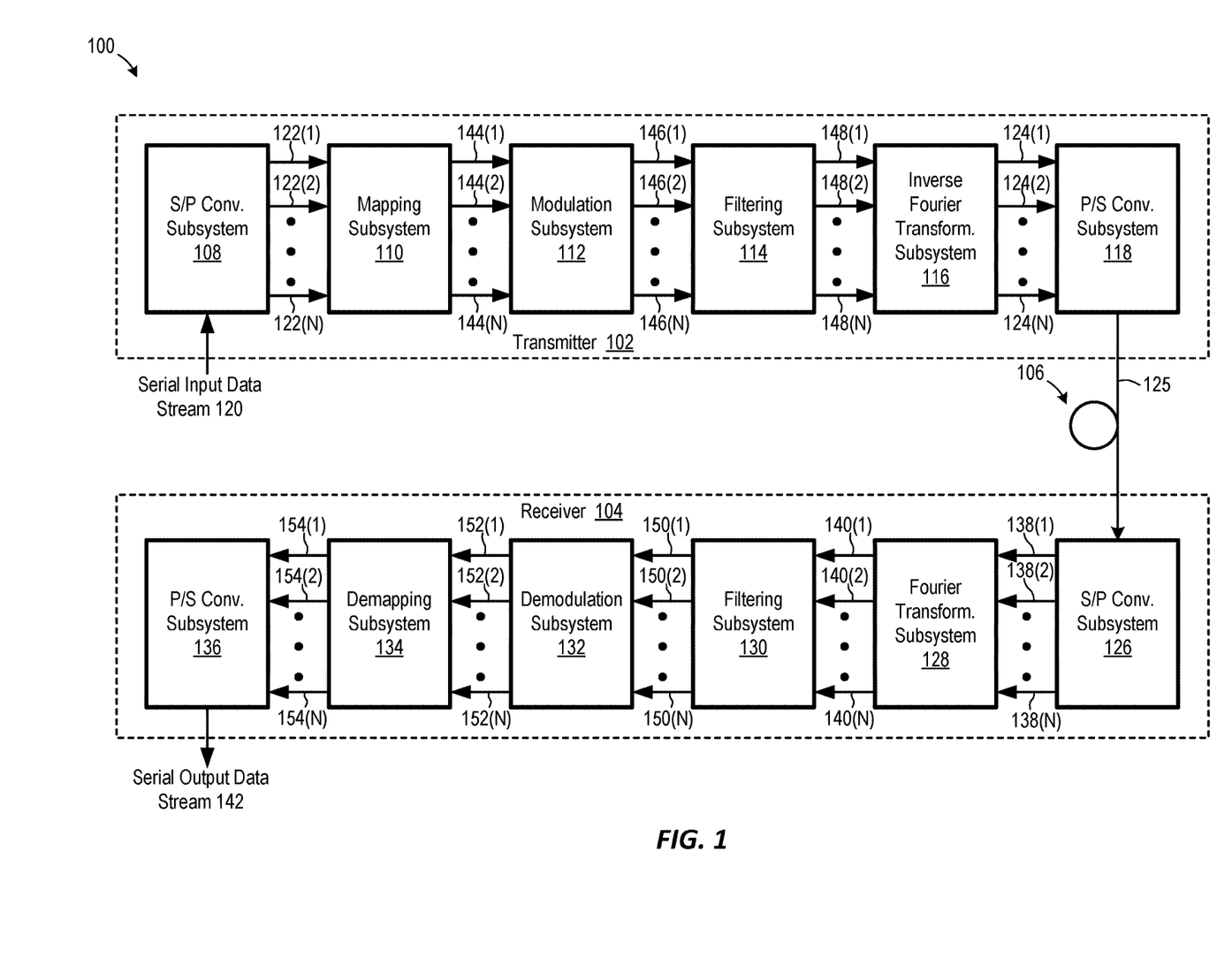
FIG. 1 is a block diagram of a system for transmitting data via a coaxial electrical cable, according to an embodiment.

FIG. 1 is a block diagram of a system 100 for transmitting data via a coaxial electrical cable. In some embodiments, system 100 is part of a cable communication network, including, but not limited to, a cable communication network configured to operate according to DOCSIS protocols. However, it should be understood that system 100 is not limited to cable communication network applications, but instead could be used in other electrical wired communication applications.

System 100 includes a transmitter 102 and a receiver 104, which are communicatively coupled by coaxial electrical cable 106. Although coaxial electrical cable 106 is depicted in FIG. 1 as being a single coaxial electrical cable, coaxial electrical cable 106 may include multiple coaxial electrical cables, such as multiple coaxial electrical cables electrically coupled in series and/or parallel, without departing from the scope hereof. Furthermore, additional elements (not shown), including but not limited to, taps, splitters, amplifiers, and/or power inserters, may be electrically coupled to coaxial electrical cable 106.

Transmitter 102 includes a series-to-parallel (S/P) conversion subsystem 108, a mapping subsystem 110, a modulation subsystem 112, a filtering subsystem 114, an inverse Fourier transformation subsystem 116, and a parallel-to-series (P/S) conversion subsystem 118. Each of subsystems 108-118 are implemented, for example, by analog and/or digital electronic circuitry. Although each of subsystems 108-118 is illustrated as being a separate element, in some embodiments, two or more of subsystems 108-118 share one or more common elements. For example, in some embodiments, some or all of subsystems 108-118 are at least partially implemented by a processor (not shown) executing instructions stored in a memory (not shown), such as discussed below with respect to FIG. 6. Additionally, not all elements of transmitter 102 need be located at a single location.

S/P conversion subsystem 108 is configured to convert a serial input data stream 120 into N parallel input data streams 122, where N is an integer greater than one. Although N is depicted as being greater than two, N could be equal to two without departing from the scope hereof. In this document, specific instances of an item may be referred to by use of a numeral in parentheses (e.g., input data stream 122(1)), while numerals without parentheses refer to any such item (e.g., input data streams 122). Mapping subsystem 110 is communicatively coupled to S/P conversion subsystem 108, and mapping subsystem 110 is configured to map data bits of each input data stream 122 into symbols to generate input data streams 144. In some embodiments, mapping subsystem 110 is configured to map data bits of each input data stream 122 into symbols by mapping the data bits into a constellation, such as by using quadrature amplitude modulation (QAM), e.g. offset quadrature amplitude modulation (OQAM). However, mapping subsystem 110 may be configured to map data bits into symbols using other techniques, including but not limited to phase-shift keying (PSK) or amplitude-shift keying (ASK).

Figure 2:
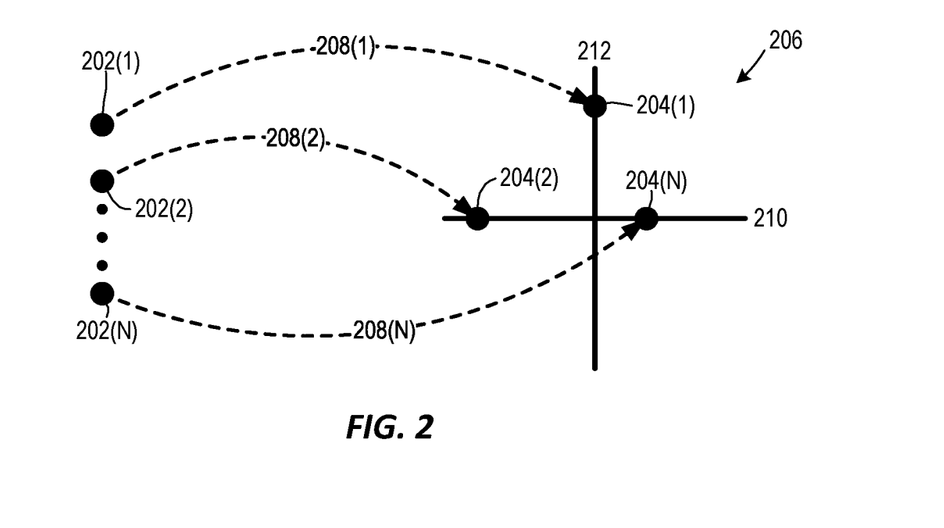
FIG. 2 is a schematic diagram illustrating one example of operation of a mapping subsystem, according to an embodiment.

FIG. 2 is a schematic diagram illustrating one example of operation of mapping subsystem 110 using OQAM to map data bits 202 of input data streams 122 into symbols 204, in a constellation 206. Specially, data bit 202(1) is mapped 208(1) into symbol 204(1), data bit 202(2) is mapped 208(2) into symbol 204(2), and so on. Each symbol 204 is characterized by two coordinates representing the symbol's location along each of a first axis 210 and a second axis 212, respectively, of constellation 206. In some embodiments, each symbol 204 is a complex number, axis 210 represents a real portion of the number, and axis 212 represents an imaginary portion of the number.

Figure 3:
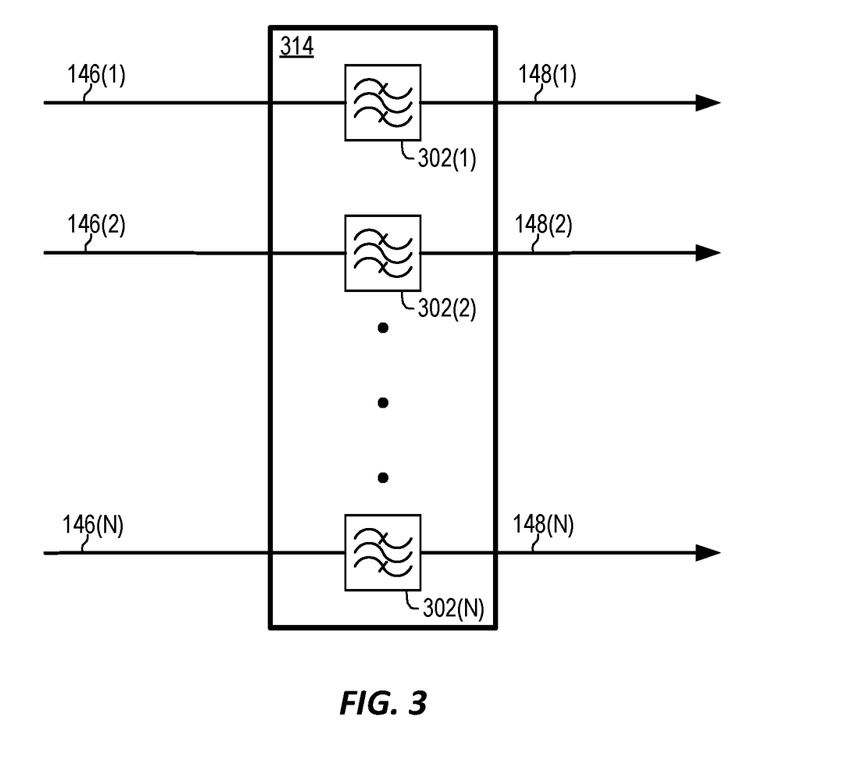
FIG. 3 is a block diagram of a filtering subsystem, according to an embodiment.

With further reference to FIG. 1, modulation subsystem 112 is communicatively coupled to mapping subsystem 110 and is configured to convert symbols of each data stream 144 from digital form to analog form based on a desired modulation scheme, such as OQAM, to generate input data streams 146. Filtering subsystem 114 is communicatively coupled to modulation subsystem 112 and is configured to individually filter symbols of each parallel input data stream 146, i.e. to filter symbols of each input data stream 144 separately from symbols of each other input data stream 146 to generate input data streams 148. For example, FIG. 3 is a block diagram of a filtering subsystem 314, which is one possible embodiment of filtering subsystem 114. Filtering subsystem 314 implements a respective filtering function 302 for each input data stream 146. As discussed above, individually filtering each input data stream advantageously helps reduce intrinsic interference between subcarriers and OOB emissions to lower level than is typically feasible with OFDM, thereby promoting throughput and spectrum efficiency. In some embodiments, filtering subsystem 314 implements a prototype filter characterized by an overlapping factor (K) and magnitude coefficients ($H_K$). K represents a number of multi-carrier symbols that overlap in the time domain, and $H_K$ represents magnitude of symbol overlaps with adjacent symbols. In some embodiments, K and $H_K$ are optimized for system 100, e.g. for coaxial electrical cable 106.

Referring again to FIG. 1, inverse Fourier transformation subsystem 116 is communicatively coupled to filtering subsystem 114 and is configured to transform symbols of each input data stream 148 from a frequency-domain to a time-domain, to generate first time-domain samples 124. In some embodiments, time-domain samples 124 include both a real component and an imaginary component. Inverse Fourier transformation subsystem 116 transforms symbols of each input data stream 148 from a frequency-domain to a time-domain, for example, using an inverse fast Fourier transform technique.

P/S conversion subsystem 118 is communicatively coupled to inverse Fourier transformation subsystem 116 and is configured to convert parallel first time-domain samples 124 to a serial multi-carrier signal 125, for injecting onto coaxial electrical cable 106. Coaxial electrical cable 106 carries multi-carrier signal 125 to receiver 104.

Figure 4:
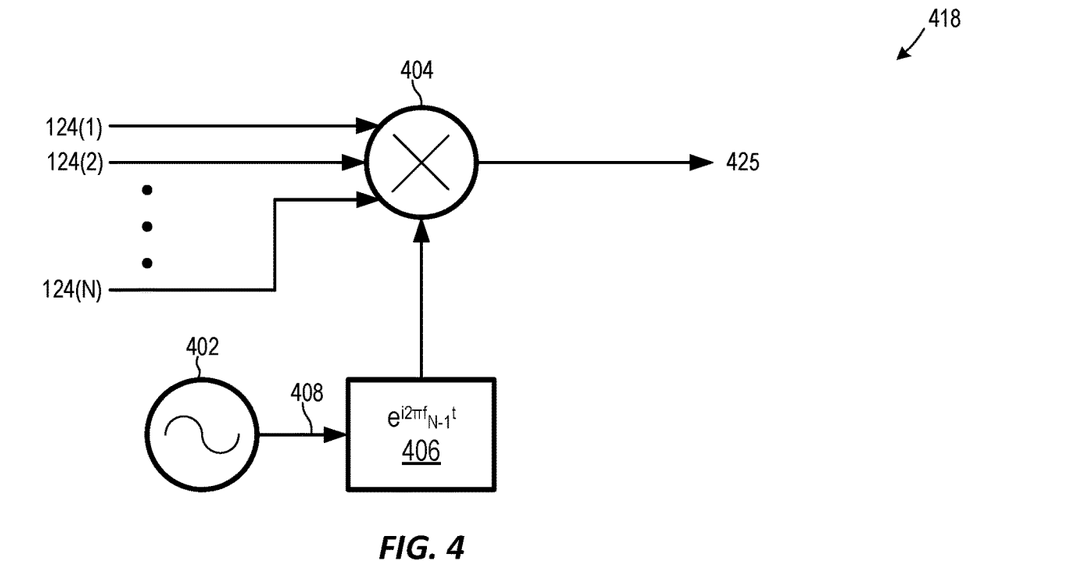
FIG. 4 is a block diagram of a parallel-to-serial conversion subsystem, according to an embodiment.

FIG. 4 is a block diagram of a P/S conversion subsystem 418, which is one possible embodiment of P/S conversion subsystem 118. P/S conversion subsystem 418 includes a carrier source 402, a multiplier 404, and a shifter 406. Carrier source 402 generates a common carrier signal 408, and multiplier 404 multiplies each time-domain sample 124 by common carrier signal 408, as phase-shifted $e^{2\pi f_{N-1} t}$ radians by shifter 406, to generate a serial multi-carrier signal 425, which is an embodiment of multi-carrier signal 125. Multi-carrier signal 425 is injected onto coaxial electrical cable 106, for example, using electrical conductors and/or interface circuitry coupling P/S conversion subsystem 418 to coaxial electrical cable 106. Such interface circuitry, when present, includes, for example, passive and/or electrical components for electrically interfacing P/S conversion subsystem 418 with coaxial electrical cable 106. Coaxial electrical cable 106 carries multi-carrier signal 425 to receiver 104.

With further reference to FIG. 1, receiver 104 includes a S/P conversion subsystem 126, a Fourier transformation subsystem 128, a filtering subsystem 130, a demodulation subsystem 132, a demapping subsystem 134, and a P/S conversion subsystem 136. Each of subsystems 126-136 are implemented, for example, by analog and/or digital electronic circuitry. Although each of subsystems 126-136 is illustrated as being a separate element, in some embodiments, two or more of subsystems 126-136 share one or more common elements. For example, in some embodiments, some or all of subsystems 126-136 are at least partially implemented by a processor (not shown) executing instructions stored in a memory (not shown), such as discussed below with respect to FIG. 7. Additionally, not all elements of receiver 104 need be located at a single location.

S/P conversion subsystem 126 is configured to convert serial multi-carrier signal 125 received from coaxial electrical cable 106 to parallel streams of second time domain samples 138 (1), 138 (2) to 138 (N). In some embodiments, second time-domain samples 138 include both a real component and an imaginary component. S/P conversion subsystem 126 receives multi-carrier signal 125 from coaxial electrical cable 106, for example, using electrical conductors and/or interface circuitry coupling S/P conversion subsystem 126 to coaxial electrical cable 106. Such interface circuitry, when present, includes, for example, passive and/or electrical components for electrically interfacing S/P conversion subsystem 126 with coaxial electrical cable 106.

Figure 5:
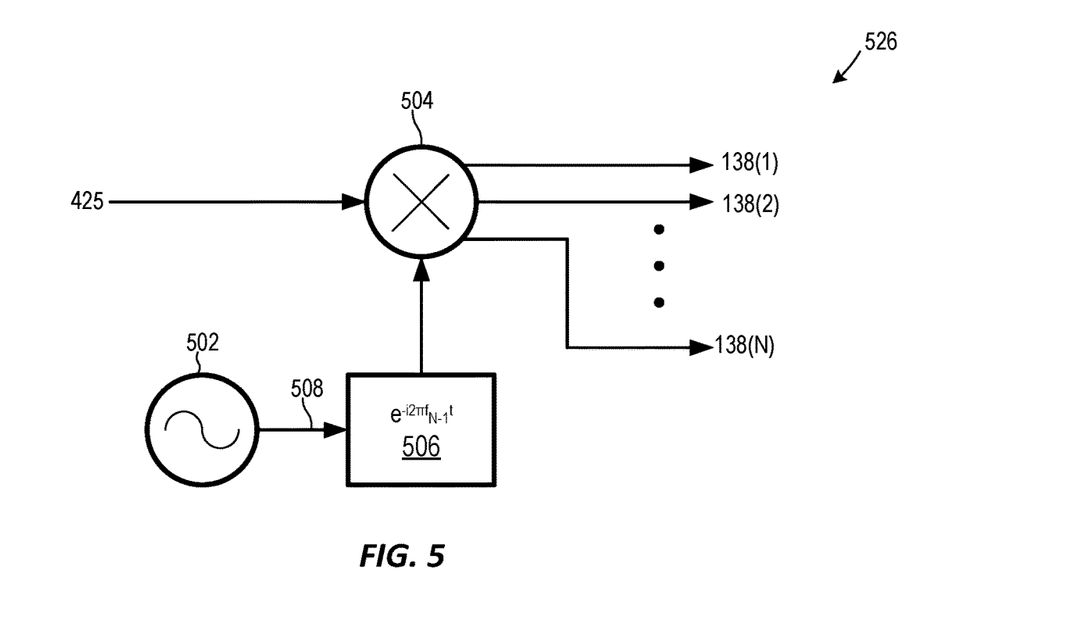
FIG. 5 is a block diagram of a serial-to-parallel conversion subsystem, according to an embodiment.

FIG. 5 is a block diagram of a S/P conversion subsystem 526, which is one possible embodiment of S/P conversion subsystem 126. S/P conversion subsystem 526 includes a carrier source 502, a multiplier 504, and a shifter 506. Carrier source 502 generates a common carrier signal 508, and multiplier 504 multiplies multi-carrier signal 425 by common carrier signal 508, as phase-shifted $e^{-i2\pi f_{N-1}t}$ radians by shifter 506, to generate N parallel second time-domain samples 138.

With reference again to FIG. 1, Fourier transformation subsystem 128 is communicatively coupled to S/P conversion subsystem 126 and is configured to transform time domain samples 138 from a time-domain to a frequency-domain, to generate a plurality of parallel output data streams 140. In some embodiments, Fourier transformation subsystem 128 is further configured to transform time-domain samples 138 from the time-domain to the frequency-domain using a fast Fourier transform technique. Filtering subsystem 130 is communicatively coupled to transformation subsystem 128 and is configured to individually filter symbols of each output data stream 140, i.e. to filter symbols of each output data stream 140 separately from symbols of each other output data stream 140, to generate output data streams 150. In some embodiments, filtering subsystem 130 is embodied in the same manner as filtering subsystem 114. Demodulation subsystem 132 is communicatively coupled to filtering subsystem 130 and is configured to convert symbols of each output data stream 150 from analog form to digital form based on a desired modulation scheme, such as OQAM, to generate output data streams 152.

Demapping subsystem 134 is communicatively coupled to demodulation subsystem 132, and demapping subsystem 134 is configured to demap symbols of each output data stream 152 into data bits, to generate output data streams 154. In some embodiments, demapping subsystem 134 is configured demap symbols of each output data stream 152 into data bits using an inverse of QAM, e.g. OQAM. However, demapping subsystem 134 may be configured to demap symbols of each output data stream 152 into data bits using other techniques, including but not limited to an inverse of PSK or an inverse of ASK. P/S conversion subsystem 136 is communicatively coupled to demapping subsystem 134 and is configured to convert data bits of each output data stream 154 into a common serial output data stream 142.

Figure 6:
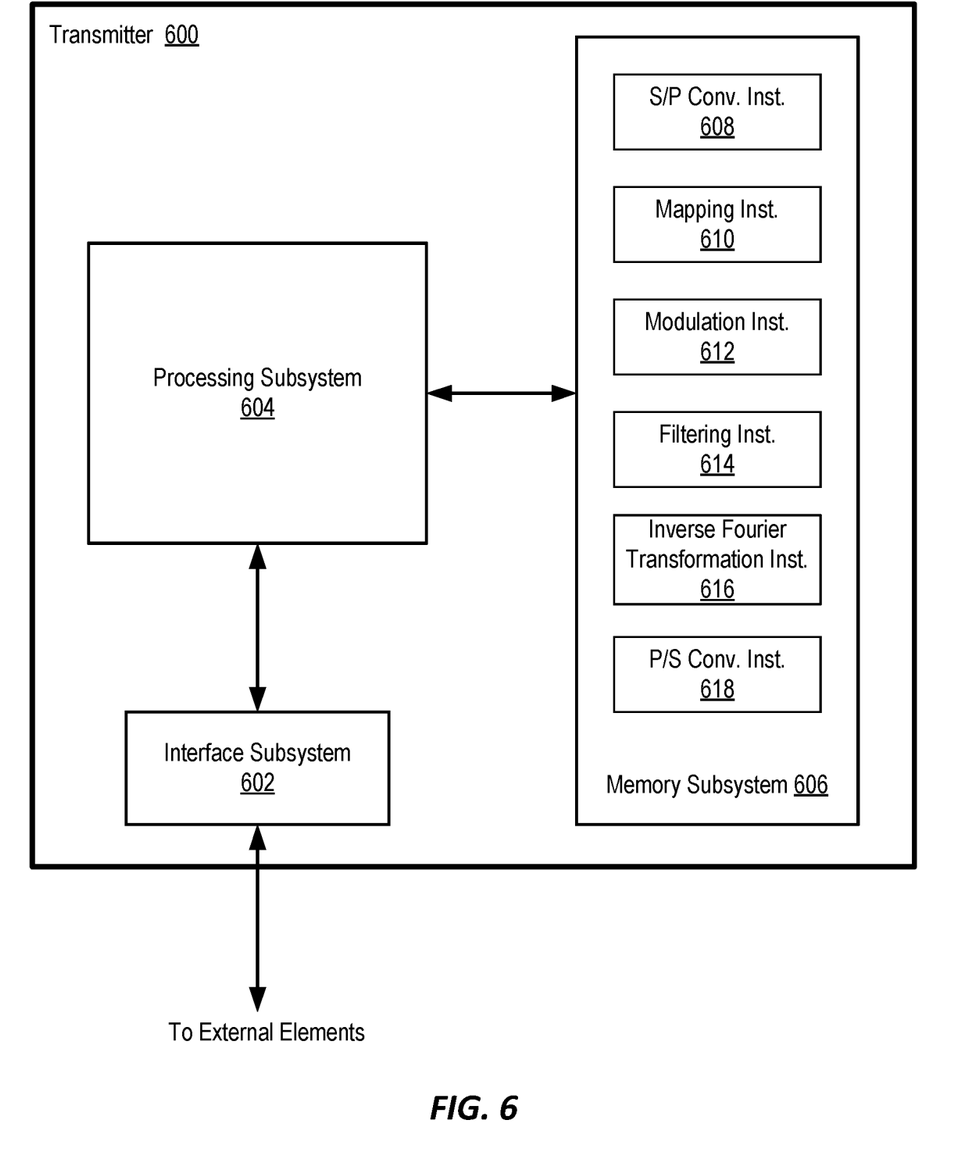
FIG. 6 is a block diagram of a transmitter, according to an embodiment.

FIG. 6 is a block diagram of a transmitter 600, which is one possible embodiment of transmitter 102 of FIG. 1. However, transmitter 102 is not limited to the embodiment of FIG. 6. Transmitter 600 of FIG. 6 includes an interface subsystem 602, a processing subsystem 604, and a memory subsystem 606. Although interface subsystem 602, processing subsystem 604, and memory subsystem 606 are each illustrated as being single elements, one or more of interface subsystem 602, processing subsystem 604, and memory subsystem 606 can include multiple constituent elements, which do not necessarily need to be located at a common location. For example, interface subsystem 602, processing subsystem 604, and memory subsystem 606 may be implemented by a distributed computing system including a plurality of constituent components at different locations.

Interface subsystem 602 is configured to communicatively couple transmitter 600 with external elements, such as coaxial electrical cable 106 and/or a source of serial input data stream 120. In some embodiments, interface subsystem 602 includes circuitry for converting signals from external elements to a form suitable for transmitter 600, and vice versa. For example, in certain embodiments, interface subsystem 602 is configured to transform voltage of signals, and in particular embodiments, interface subsystem 602 is configured to transform signals between an optical domain and an electrical domain.

Processing subsystem 604 includes, for example, one or more processing devices (not shown) located at a single location or distributed among multiple locations, such as in multiple data centers. The one or more processing devices of processing subsystem 604 need not all have the same configuration. For example, processing subsystem 604 could include both microprocessors in a local server and processing resources in a cloud computing service. Memory subsystem 606 includes, for example, one or more memory devices (not shown) located at a single location or distributed among multiple locations. The one or more memory devices of memory subsystem 606 need not all have the same configuration. For example, memory subsystem 606 could include one or more solid-state memory modules and one or more magnetic data storage devices.

Memory subsystem 606 includes S/P conversion instructions 608, mapping instructions 610, modulation instructions 612, filtering instructions 614, inverse Fourier transformation instructions 616, and P/S conversion instructions 618. Instructions 608-618 are, for example, software and/or firmware. Processing subsystem 604 is configured to (a) execute instructions 608 to at least partially implement S/P conversion subsystem 108, (b) execute instructions 610 to at least partially implement mapping subsystem 110, (c) execute instructions 612 to at least partially implement modulation subsystem 112, (d) execute instructions 614 to at least partially implement filtering subsystem 114, (e) execute instructions 616 to at least partially implement inverse Fourier transformation subsystem 116, and (f) execute instructions 618 to at least partially implement P/S conversion subsystem 118.

Figure 7:
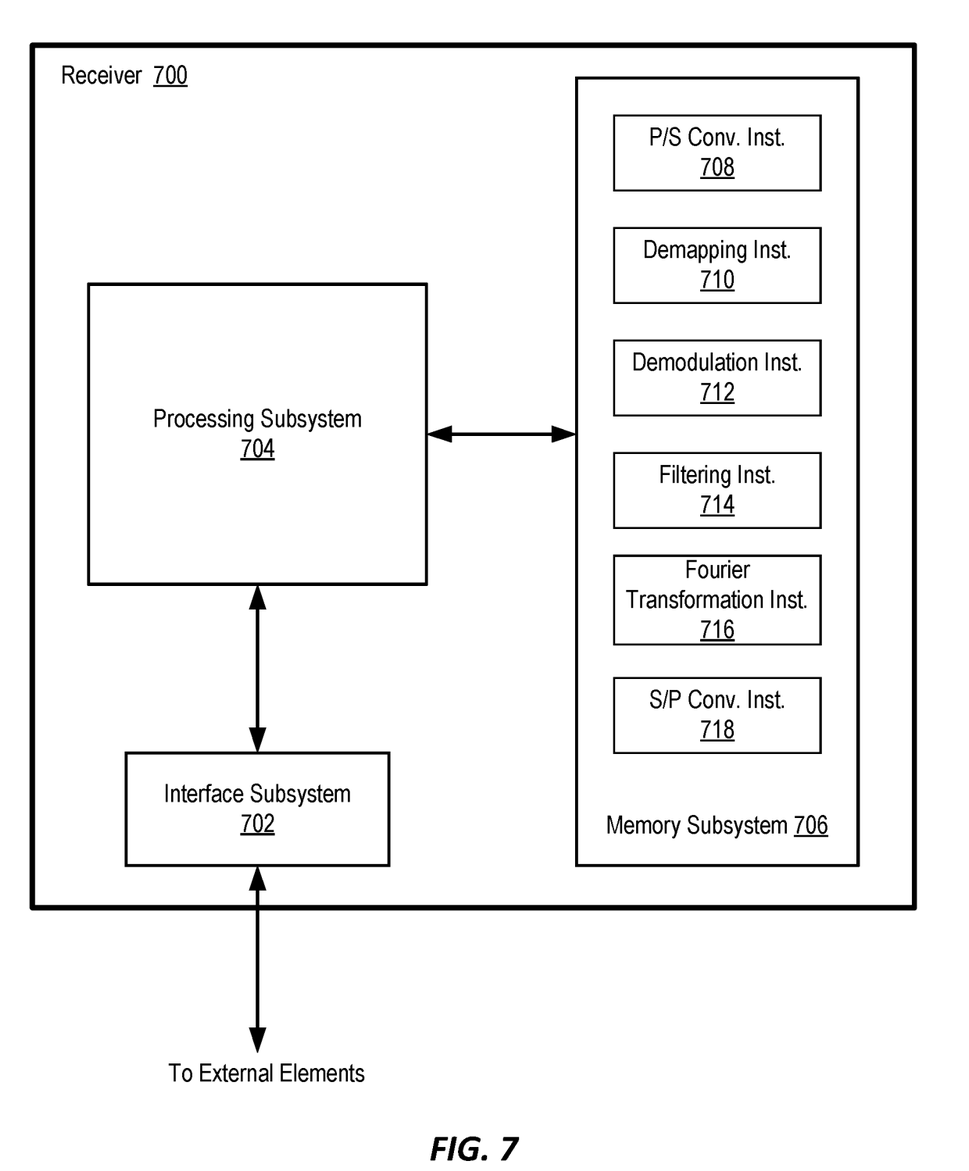
FIG. 7 is a block diagram of a receiver, accordingly to an embodiment.

FIG. 7 is a block diagram of a receiver 700, which is one possible embodiment of receiver 104 of FIG. 1. However, receiver 104 is not limited to the embodiment of FIG. 7. Receiver 700 of FIG. 7 includes an interface subsystem 702, a processing subsystem 704, and a memory subsystem 706. Although interface subsystem 702, processing subsystem 704, and memory subsystem 706 are each illustrated as being single elements, one or more of interface subsystem 702, processing subsystem 704, and memory subsystem 706 can include multiple constituent elements, which do not necessarily need to be located at a common location. For example, interface subsystem 702, processing subsystem 704, and memory subsystem 706 may be implemented by a distributed computing system including a plurality of constituent components at different locations.

Interface subsystem 702 is configured to communicatively couple receiver 700 with external elements, such as coaxial electrical cable 106 and/or a receiver of serial output data stream 142. In some embodiments, interface subsystem 702 includes circuitry for converting signals from external elements to a form suitable for receiver 700, and vice versa. For example, in certain embodiments, interface subsystem 702 is configured to transform voltage of signals, and in particular embodiments, interface subsystem 702 is configured to transform signals between an optical domain and an electrical domain.

Processing subsystem 704 includes, for example, one or more processing devices (not shown) located at a single location or distributed among multiple locations, such as in multiple data centers. The one or more processing devices of processing subsystem 704 need not all have the same configuration. For example, processing subsystem 704 could include both microprocessors in a local server and processing resources in a cloud computing service. Memory subsystem 706 includes, for example, one or more memory devices (not shown) located at a single location or distributed among multiple locations. The one or more memory devices of memory subsystem 706 need not all have the same configuration. For example, memory subsystem 706 could include one or more solid-state memory modules and one or more magnetic data storage devices.

Memory subsystem 706 includes P/S conversion instructions 708, demapping instructions 710, demodulation instructions 712, filtering instructions 714, Fourier transformation instructions 716, and S/P conversion instructions 718. Instructions 708-718 are, for example, software and/or firmware. Processing subsystem 704 is configured to (a) execute instructions 708 to at least partially implement P/S conversion subsystem 136, (b) execute instructions 710 to at least partially implement demapping subsystem 134, (c) execute instructions 712 to at least partially implement demodulation subsystem 132, (d) execute instructions 714 to at least partially implement filtering subsystem 130, (e) execute instructions 716 to at least partially implement Fourier transformation subsystem 128, and (f) execute instructions 718 to at least partially implement S/P conversion subsystem 126.

Figure 8:
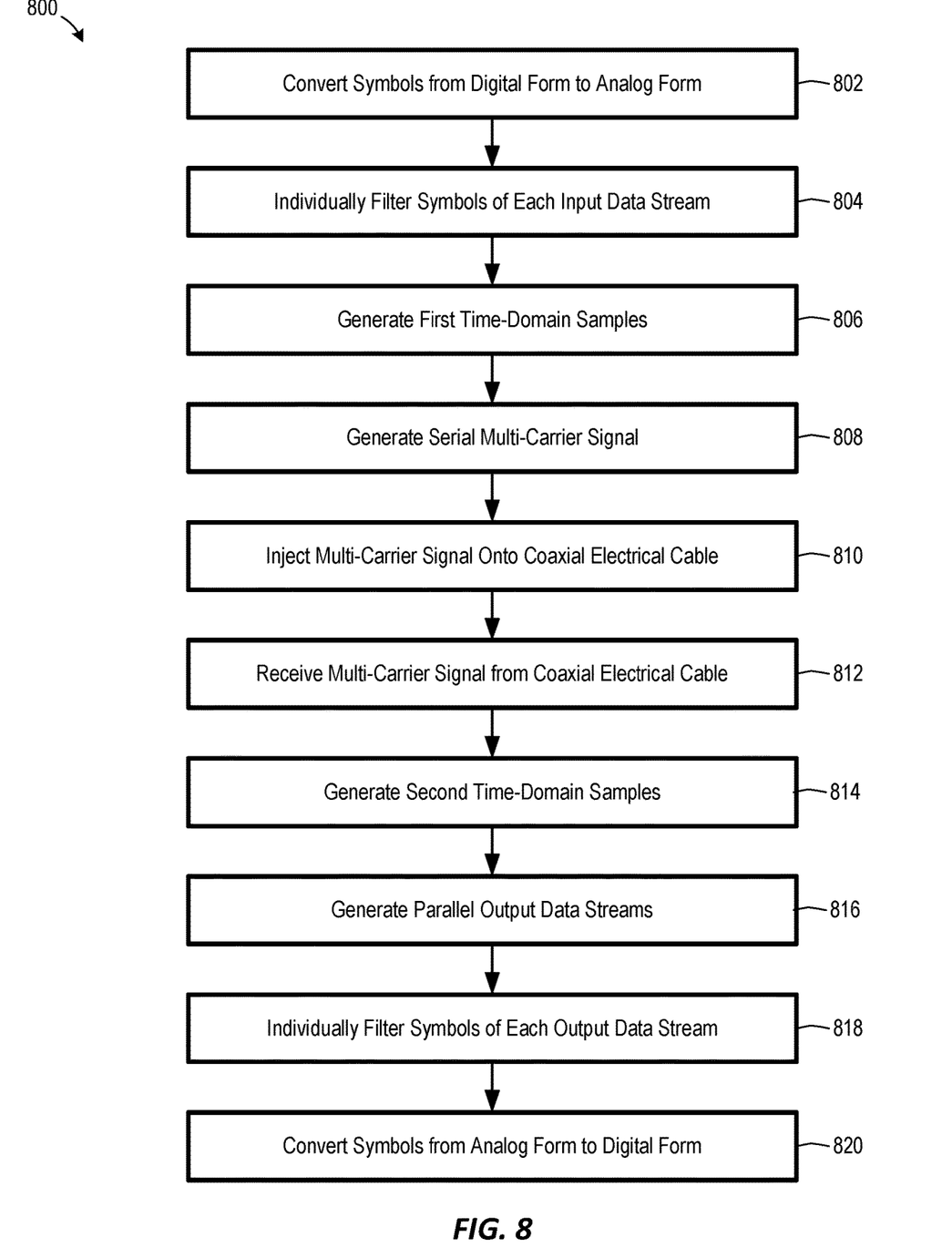
FIG. 8 is a flow chart illustrating a method for transmitting data via a coaxial electrical cable, according to an embodiment.

FIG. 8 is a flow chart illustrating a method 800 for transmitting data via a coaxial electrical cable. In a block 802 of method 800, symbols of each input data stream of a plurality of parallel input data streams are converted from digital form to analog form. In one example of block 802, modulation subsystem 112 converts symbols of input data streams 144 from digital form to analog form. In a block 804, symbols of each input data stream are individually filtered. In one example of block 804, filtering subsystem 114 individually filters symbols of input data streams 146. In a block 806, symbols of each input data stream are transformed from a first frequency-domain to a first time-domain, to generate first time-domain samples. In one example of block 806, Inverse Fourier transformation subsystem 116 transforms symbols of input data streams 148 from a frequency domain to a time domain, to generate parallel first time-domain samples 124.

In a block 808, the first time-domain samples are converted to a serial multi-carrier signal. In one example of block 808, P/S conversion subsystem 118 converts first time-domain signals 124 to a multi-carrier signal 125. In a block 810, the multi-carrier signal is injected onto the coaxial electrical cable. In one example of block 810, transmitter 102 injects multi-carrier signal 125 onto coaxial electrical cable 106, such as using (1) electrical conductors coupling P/S conversion subsystem 118 to coaxial electrical cable 106, and/or (2) an interface subsystem (e.g. interface subsystem 602 of FIG. 6).

In a block 812, the multi-carrier signal is received from the coaxial electrical cable. In one example of block 812, receiver 104 receives multi-carrier signal 125 from coaxial electrical cable 106, such as using (1) electrical conductors coupling S/P conversion subsystem 126 to coaxial electrical cable 106, and/or (2) an interface subsystem (e.g. interface subsystem 702 of FIG. 7). In a block 814, the multi-carrier signal is converted into parallel second time-domain samples. In one example of block 814, multi-carrier signal 125 is converted by S/P conversion subsystem 126 to generate second time-domain samples 138. In a block 816, second time-domain samples are transformed from a second time-domain to a second frequency-domain, to generate a plurality of parallel output data streams. In one example of block 816, Fourier transformation subsystem 128 transforms second time-domain samples 138 from a time domain to a frequency domain, to generate parallel output data streams 140.

In a block 818, symbols of each output data stream are individually filtered. In one example of block 818, filtering subsystem 130 individually filters symbols of each output data stream 140. In a block 820, symbols of each output data stream are converted from analog form to digital form. In one example of block 820, demodulation subsystem 132 converts symbols of each output data stream 150 from analog form to digital form.

Combinations of Features

Features described above may be combined in various ways without departing from the scope hereof. The following examples illustrate some possible combinations:

(A1) A method for transmitting data via a coaxial electrical cable may include (a) converting symbols of each input data stream of a plurality of parallel input data streams from digital form to analog form; (b) after step (a), individually filtering symbols of each input data stream; (c) after step (b), transforming symbols of each input data stream from a first frequency-domain to a first time-domain, to generate parallel first time-domain samples; (d) after step (c), converting the first time-domain samples to a serial multi-carrier signal; and (e) injecting the multi-carrier signal onto the coaxial electrical cable.

(A2) The method denoted as (A1) may further include (f) receiving the multi-carrier signal from the coaxial electrical cable; (g) converting the multi-carrier signal into parallel second time-domain samples; (h) transforming the second time-domain samples from a second time-domain to a second frequency-domain, to generate a plurality of parallel output data streams; (i) after step (h), individually filtering symbols of each output data stream; and (j) after step (i), converting symbols of each output data stream from analog form to digital form.

(A3) The method denoted as (A2) may further include, after step (j), demapping symbols of each output data stream into data bits.

(A4) In the method denoted as (A3), demapping symbols of each output data stream into data bits may include using an inverse of quadrature amplitude modulation (QAM).

(A5) In the method denoted as (A4), the inverse of QAM may include an inverse of offset quadrature amplitude modulation (OQAM).

(A6) Any one of the methods denoted as (A3) through (A5) may further include, after the step of demapping, converting data bits of each output data stream into a common serial output data stream.

(A7) In any one of the methods denoted as (A2) through (A6), transforming the second time-domain samples from the second time-domain to the second frequency-domain may include using a Fourier transform technique.

(A8) Any one of the methods denoted as (A1) through (A7) may further include, before step (a), mapping data bits of each input data stream into symbols.

(A9) In the method denoted as (A8), mapping data bits of each input data stream into symbols may include using quadrature amplitude modulation (QAM).

(A10) In the method denoted as (A9), the QAM may include offset quadrature amplitude modulation (OQAM).

(A11) Any one of the methods denoted as (A8) through (A10) may further include, before the step of mapping, converting a serial input data stream into the parallel input data streams.

(A12) In any one of the methods denoted as (A1) through (A11), transforming symbols of each input data stream from the first frequency-domain to the first time-domain may include use an inverse Fourier transform technique.

(B1) A transmitter for use with a coaxial electrical cable may include (1) a modulation subsystem configured to convert symbols of each input data stream of a plurality of parallel input data streams from digital form to analog form, (2) a filtering subsystem communicatively coupled to the modulation subsystem and configured to individually filter symbols of each input data stream, (3) an inverse Fourier transformation subsystem communicatively coupled to the filtering subsystem and configured to transform symbols of each input data stream from a frequency-domain to a time-domain, to generate parallel time-domain samples, and (4) a parallel-to-series (P/S) conversion subsystem communicatively coupled to the inverse Fourier transformation subsystem and configured to convert the time-domain samples into a serial multi-carrier signal.

(B2) The transmitter denoted as (B1) may further include a mapping subsystem communicatively coupled to the modulation subsystem and configured to map data bits of each input data stream into symbols.

(B3) The transmitter denoted as (B2) may further include a series-to-parallel conversion subsystem communicatively coupled to the mapping subsystem and configured to convert a serial input data stream into the plurality of parallel input data streams.

(B4) In any one of the transmitters denoted as (B1) through (B3), the inverse Fourier transformation subsystem may be further configured to transform symbols of each input data stream from the frequency-domain to the time-domain using an inverse Fourier transform technique.

(C1) A receiver for use with a coaxial electrical cable may include (1) a series-to-parallel (S/P) conversion subsystem configured to convert a serial multi-carrier signal received from the coaxial electrical cable to parallel time-domain samples, (2) a Fourier transformation subsystem communicatively coupled to the S/P conversion subsystem and configured to transform the time domain samples from a time-domain to a frequency-domain, to generate a plurality of parallel output data streams, (3) a filtering subsystem communicatively coupled to the Fourier transformation subsystem and configured to individually filter symbols of each output data stream, and (4) a demodulation subsystem communicatively coupled to the filtering subsystem and configured to convert symbols of each output data stream from analog form to digital form.

(C2) The receiver denoted as (C1) may further include a demapping subsystem communicatively coupled to the demodulation subsystem and configured to demap symbols of each output data stream into data bits.

(C3) The receiver denoted as (C2) may further include a parallel-to-series conversion subsystem communicatively coupled to the demapping subsystem and configured to convert data bits of each output data stream into a common serial output data stream.

(C4) In any one of the receivers denoted as (C1) through (C3), the Fourier transformation subsystem may be further configured to transform the time domain samples from the time-domain to the frequency-domain using a Fourier transform technique.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A receiver for use with a cable, comprising:
  a series-to-parallel (S/P) conversion subsystem configured to convert a serial multi-carrier signal received from the cable to a plurality of parallel time-domain samples, the S/P conversion subsystem including:
    a carrier source configured to generate a common carrier signal,
    a phase shifter configured to shift a phase of the common carrier signal to generate a phase-shifted common carrier signal, and
    a multiplier configured to multiply the serial multi-carrier signal by the phase-shifted common carrier signal to generate the plurality of parallel time-domain samples;
  a transformation subsystem communicatively coupled to the S/P conversion subsystem and configured to transform the plurality of parallel time-domain samples from a time-domain to a frequency-domain, to generate a plurality of parallel first output data streams;
  a filtering subsystem communicatively coupled to the transformation subsystem and configured to individually filter symbols of each parallel first output data stream of the plurality of parallel first output data streams to generate a plurality of parallel second output data streams; and
  a demodulation subsystem communicatively coupled to the filtering subsystem and configured to convert symbols of each parallel second output data stream of the plurality of parallel second output data streams from analog form to digital form, to generate a plurality of parallel third output data streams.

2. The receiver of claim 1, further comprising a demapping subsystem communicatively coupled to the demodulation subsystem and configured to demap symbols of the plurality of parallel third output data streams to generate a plurality of parallel fourth output data streams.

3. The receiver of claim 2, further comprising a parallel-to-series conversion subsystem communicatively coupled to the demapping subsystem and configured to convert the plurality of parallel fourth output data streams into a common serial output data stream.

4. The receiver of claim 1, wherein the transformation subsystem is further configured to transform the plurality of parallel time-domain samples from the time-domain to the frequency-domain using a Fourier transform technique.

5. The receiver of claim 1, wherein each sample of the plurality of parallel time-domain samples includes a real component and an imaginary component.

6. The receiver of claim 1, wherein the filtering subsystem is configured to implement a prototype filter.

7. The receiver of claim 1, wherein the demodulation subsystem is further configured to convert the symbols of each parallel second output data stream from the analog form to the digital form according to an offset quadrature amplitude modulation (OQAM) scheme.

8. The receiver of claim 1, wherein each of the S/P conversion subsystem, the transformation subsystem, the filtering subsystem, and the demodulation subsystem is at least partially implemented by a processor executing instructions stored in a memory.

9. A method for receiving data via a cable, comprising:
  converting a serial multi-carrier signal received from the cable to a plurality of parallel time-domain samples at least partially by:

generating a common carrier signal,
shifting a phase of the common carrier signal to generate a phase-shifted common carrier signal, and
generating the plurality of parallel time-domain samples from the serial multi-carrier signal and the phase-shifted common carrier signal;
transforming the plurality of parallel time-domain samples from a time-domain to a frequency-domain, to generate a plurality of parallel first output data streams;
individually filtering symbols of each parallel first output data stream of the plurality of parallel first output data streams to generate a plurality of parallel second output data streams; and
converting symbols of each parallel second output data stream of the plurality of parallel second output data streams from analog form to digital form, to generate a plurality of parallel third output data streams.

10. The method of claim 9, further comprising demapping symbols of the plurality of parallel third output data streams to generate a plurality of parallel fourth output data streams.

11. The method of claim 10, wherein demapping the symbols of the plurality of parallel third output data streams comprises using an inverse of quadrature amplitude modulation (QAM).

12. The method of claim 11, wherein the inverse of QAM comprises an inverse of offset quadrature amplitude modulation (OQAM).

13. The method of claim 10, further comprising converting the plurality of parallel fourth output data streams into a common serial output data stream.

14. The method of claim 9, wherein transforming the plurality of parallel time-domain samples from the time-domain to the frequency-domain comprises using a Fourier transform technique.

15. The method of claim 9, wherein each of the plurality of parallel time-domain samples includes a real component and an imaginary component.

16. The method of claim 9, wherein individually filtering the symbols of each parallel first output data stream of the plurality of parallel first output data streams comprises using a prototype filter to individually filter the symbols of each parallel first output data stream of the plurality of parallel first output data streams.

17. The method of claim 9, wherein the cable is selected from the group consisting of an electrical cable and an optical cable.

18. The method of claim 9, wherein generating the plurality of parallel time-domain samples from the serial multi-carrier signal and the phase-shifted common carrier signal comprises multiplying the serial multi-carrier signal by the phase-shifted common carrier signal.

* * * * *